June 19, 1962 D. S. ERNEST 3,039,264
SHROUDED NOZZLE
Filed Sept. 22, 1959
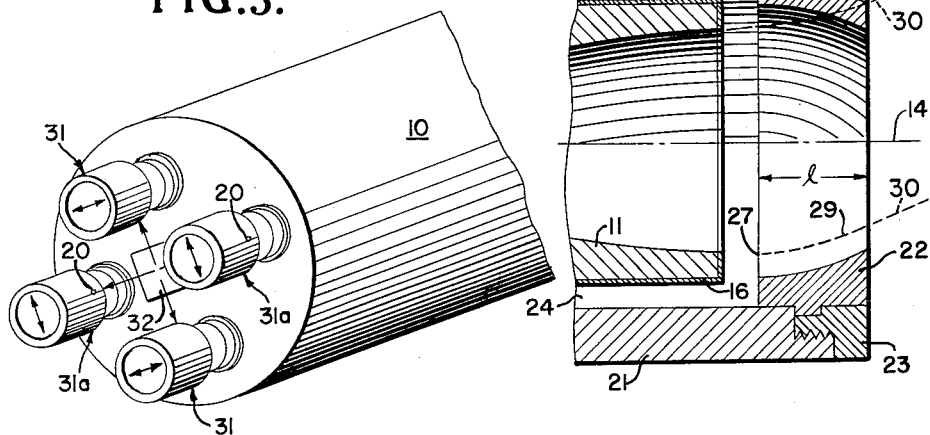
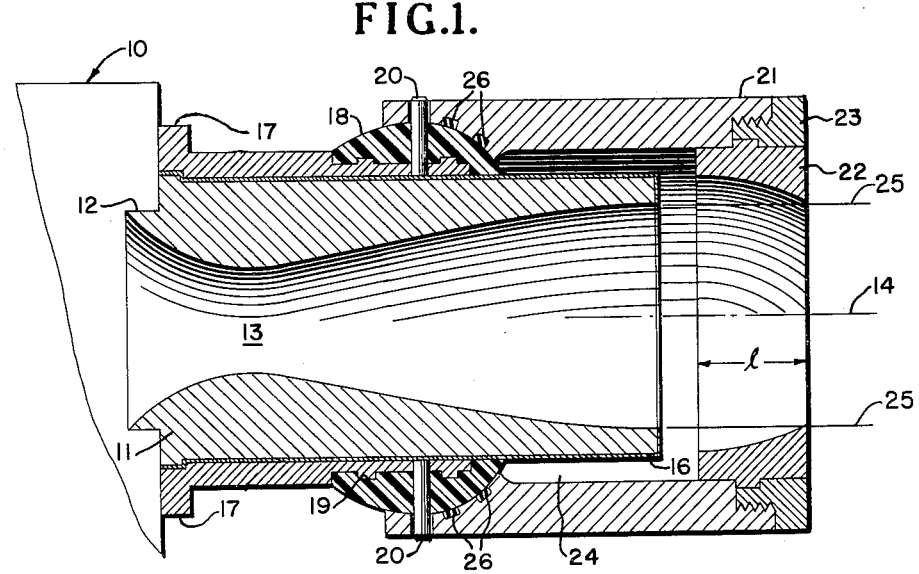
INVENTOR
DALE S. ERNEST
BY
ATTORNEYS.

United States Patent Office

3,039,264
Patented June 19, 1962

3,039,264
SHROUDED NOZZLE
Dale S. Ernest, Detroit, Mich., assignor to the United States of America as represented by the Secretary of the Navy
Filed Sept. 22, 1959, Ser. No. 841,656
4 Claims. (Cl. 60—35.55)
(Granted under Title 35, U.S. Code (1952), sec. 266)

The invention described herein may be manufactured and used by or for the Government of the United States of America for governmental purposes without the payment of any royalties thereon or therefor.

The present invention relates generally to a thrust vector control system for use in conjunction with a reaction motor vehicle and is more particularly concerned with a system for controlling the direction of the main propulsion thrust of a rocket propelled missile thereby to stabilize the missile.

Similar devices for steering a missile are old in the art and are known generally as jetavators. U.S. Patent 2,780,059, for example, shows a jetavator system particularly designed for controlling the direction of the gaseous jet issuing from a nozzle. The type of control system typified by the jetavator described in U.S. Patent 2,780,-059 is satisfactory for use with jet aircraft and for controlling the direction of thrust of a missile employing a rather low specific impulse propellant. However, propellants used in modern missiles generally include substantial percentages of aluminum to increase the specific impulse of the fuel. Upon combustion of these fuels, aluminum oxide is built up on the control surfaces of conventional jetavators which locks the jetavator in one position and prevents movement of the jetavator in response to control impulses supplied from the guidance section of the missile. Furthermore, the jetavators now in use are inherently inefficient since they operate basically by putting a baffle at one side of the thrust nozzle thereby creating undue turbulence in the jet exhaust stream which, of course, detracts from the thrust of the nozzle. Furthermore, this baffle tends to induce hot gaseous flow back towards the bearing surfaces of the jetavator thereby increasing the tendency of the jetavator to bind.

It is an object of the present invention to provide a shrouded nozzle having a thrust deflection portion which is spaced radially from the rocket exhaust issuing from the thrust nozzle when the jetavator is in the "No Control" position and which forms a smoothly contoured continuation of the thrust nozzle when it is in the fully deflected or maximum control position.

Another object of this invention is the provision of a shrouded nozzle having a deflection ring which produces no induced flow of hot gases back to the area of sliding contact between the shroud and the thrust nozzle even when the deflection ring is in the fully deflected position.

Another object is the provision of a new and novel jetavator type deflect ring for modifying the effective direction of thrust of a reaction motor which can be used in conjunction with a rocket motor having an aluminum containing propellant and which decreases the danger of build-up of aluminum oxide between the discharge end of the nozzle and the thrust deflector ring.

Still another object is the provision of a new and improved thrust vectoring control system which reduces the losses in the discharge thrust of the nozzle due to turbulence even when the thrust control device is in the position of maximum thrust deflection.

These and many other objects will become more readily apparent to those skilled in the art when the following specification is read and considered in the light of the attendant drawing wherein like numerals are employed to designate like or similar parts throughout the various views and in which:

FIG. 1 is a longitudinal section of a typical nozzle and thrust vectoring means embodying the principles of this invention;

FIG. 2 is a longitudinal section of the discharge portion of the nozzle of FIG. 1 and rotated 90° with respect to FIG. 1; and, FIG. 3 is a schematic representation in perspective of the discharge end of a rocket utilizing the principles of the invention.

Referring now with greater particularity to FIGS. 1 and 2, the rocket nozzle shown therein comprises a nozzle 11 affixed to the discharge end 12 of a typical rocket motor 10. The nozzle 11 may preferably be what is herein referred to as a contoured nozzle, so that the inner diameter of the nozzle remains essentially constant over the final portion of the discharge end of the nozzle. This design of nozzle is slightly more efficient than a "cone" type nozzle which continuously increases in internal diameter downstream of throat 13. Furthermore, the discharge of gases from a contoured nozzle emerges substantially parallel to the longitudinal axis 14 of the nozzle thereby resulting in certain advantages peculiar to this system. A thin coating of ceramic material such, for example, as zirconium oxide is formed at the outer surface 16 of the nozzle to retard heat transfer through the body of the nozzle. A collar 17 is affixed to the discharge end of the rocket motor 12 and is disposed about the nozzle 11 and secured thereto. A toroidal, bulbous seat 18 is molded on the collar and maintained in position by means of a plurality of lands and grooves 19 formed in seat 18 and collar 17. The material employed in collar 17 is not critical and ordinary 10–20 steel may be used for the purpose. However, it is desirable that the seat 18 be composed of a high temperature plastic material; a phenolic filled with asbestos or mica such as the materials available commercially and known as RPD–150 available from Raybestos Manhattan or "Micalex" are suitable materials. It should be borne in mind that while the seat must withstand temperatures sometimes exceeding 2000° F. it need only withstand the extreme temperatures for a short time.

Affixed to collar 17 and extending through seat 18 is a pair of pins 20 on diametrically opposite sides of the seat; these pins serve to pivotally support shroud 21 disposed about nozzle 11 and which rides on seat 18. Shroud 21 is radially spaced from nozzle 11 along its entire length and extends a substantial distance beyond the discharge end of the nozzle. A deflection ring 22 is fixed to the end of shroud 21 by means of a clamping ring 23. Deflection ring 22 is composed of any suitable high temperature alloy such as "Kentanium" and curves smoothly toward the center line 14 of the nozzle as it progresses downstream of the nozzle. It should be noted that the farthest point downstream of the nozzle 11 on ring 22 touches, or almost touches but does not cross an imaginary extension of the straight portion of nozzle 11 so that ring 22 does not extend into the jet stream of the nozzle, the preiphery thereof being indicated by the lines 25, when it is in the no-control position shown in FIG. 1. Therefore, there is no induced hot gas flow in the annular channel 24 between the nozzle and the shroud 21 which would tend to erode seat 18. Nevertheless, it may be desirable to include a plurality of high temperature seals 26 between seat 18 and pivotal shroud 21.

When the shroud is deflected to its maximum extent in one direction the lower working surface of deflection ring 22 as seen in the drawing, is moved to its fully deflected position indicated by the dotted lines 29 in FIG. 2, the upper working surface is, of course, moved upwardly away from the jetstream. The leading or upstream edge of the deflection ring is moved inwardly to a point 27 which is about colinear with the imaginary extension of the straight line and discharge portion of nozzle 11; in any event, the upstream end of ring 22 does not extend into the gas stream, the periphery thereof being indicated by the dashed lines 30, to induce hot gas flow in the annular channel 24 even when the nozzle is operating at full or maximum thrust control. This feature enables the sliding contact area between seat 18 and shroud 21 to remain relatively cool and therefore prevent the freezing of the shroud on the seat. Furthermore, there is no loss in thrust due to reverse flow of gases through channel 24. This greatly increases the available thrust from the nozzle when it is subjected to maximum thrust deflection.

It should be noted that the deflection ring 22 is so designed that even under full thrust deflection, the path of the gases through the nozzle is not obstructed at the discharge end since there is no abrupt change in the effective internal diameter of the nozzle nor are there any obstructions placed in the jet gas flow, in contradistinction to the normal practice of virtually introducing a baffle at one side of the nozzle. Of course, the baffle type system of thrust vectoring is inferior to the instant mode of gradual and smooth control of the hot gases because the former system introduces excessive turbulence and eddy currents in the jet stream flow in annular channel 24, and excessive wear on the control surface of the deflection or control rings commonly used. Additionally, no surface substantially normal to the flow of discharge gases is introduced into the gas stream when it is being fully controlled. This greatly reduces the amount of aluminum oxide build-up on the deflection ring surfaces and prolongs the life of the thrust control system when used with high impulse fuels containing aluminum additive. In the older type of jet direction control devices, aluminum oxide is built-up on the portion of the deflection control member which extends into the gas stream. This build up soon became so large as to cause binding between the jetavator control surface and the discharge end of the nozzle. This problem is overcome in this invention by positioning deflection ring 22 a substantial distance downstream off the discharge end of nozzle 11 and by eliminating an abrupt obstruction in the gas discharge stream as well as by making the pivot point of the deflection ring well upstream of the discharge end of the nozzle, as indicated in FIG. 1.

As seen in the drawings, the shroud 21 is rather elongated so that the pivot pins 20 are longitudinally spaced from the deflection ring 22 at a distance which is very large compared with the length or thickness of ring 22. This promotes movement of the ring in a direction more or less normal to the longitudinal axis of the nozzle upon pivotal movement of the shroud, thereby decreasing the tendency of the downstream end of the ring to move into the gas discharge stream prior to movement of the upstream end of the ring into the stream. This has the effect of further decreasing the amount of turbulence induced in the stream as the ring moves toward the full control position. While the exact relation between the length *l* of ring 22 and the distance between the pivots 20 and ring 22 is not critical it may conveniently be about 1:3–5.

Although this type deflection system could be used in a two dimensional control system by employing a gimbal arrangement and utilizing two deflection shrouds, it is usually preferable to utilize a plurality of pairs of spaced nozzles, each having a control system as shown schematically in FIG. 3. It will be noted that the upper and lower thrust nozzle arrangements 31 as shown in FIG. 3 operate in parallel planes of action indicated by the double ended arrows while the other nozzles 31*a* operate in parallel planes of action which are perpendicular to the planes of action of the control members of the upper and lower nozzle arrangements 31. A conventional hydraulic actuator system 32 controlled by signals from the guidance section of the missle (not shown) may be employed to actuate the control members for a thrust nozzle. It should be apparent, therefore, that by merely adjusting the control applied to each nozzle, the missile itself can be controlled in roll, pitch, and yaw as necessary. Since the system of controlling the nozzles per se forms no part of this invention, it will not be described in detail herein, and the hydraulic actuator 32 and its accompanying linkage are shown only schematically in the drawing.

It is apparent from the foregoing that by this invention there is provided a new and novel thrust vectoring control system which reduces drag to a minimum even when the jet nozzles are being fully controlled and provides a sturdy and reliable construction coupled with a simple and inexpensive design.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A thrust vectoring control system in combination with a rocket motor which comprises; at least one thrust nozzle secured to the discharge end of the rocket motor, a shroud pivotally supported by said nozzle, said shroud being radially spaced from said nozzle and extending a substantial distance beyond the discharge end of the nozzle, a deflection ring of high temperature resistant material secured to the end of said shroud downstream of the discharge end of said nozzle, said deflection ring being longitudinally arcuate in interior configuration and having a discharge end of smaller diameter than the entrance end, said shroud being arranged with respect to said nozzle such that said discharge ring is wholly without the flow path of the discharge gases from said nozzle when the deflection ring is in the no control position and a circumferential part of the upstream portion of said deflection ring interior is at the edge of the gas discharge stream and forming a smooth continuation of a portion said nozzle when the deflection ring is in the full deflection position thereby to provide a smooth deflection of the discharge gases of the thrust nozzle without inducing turbulence.

2. A thrust vectoring system including a nozzle for providing thrust upon flow of a gas stream therethrough, a toroidal seat disposed about the outer surface of said nozzle, a shroud pivotally mounted on said seat for movement in one plane, said shroud extending substantially beyond the discharge end of said nozzle and radially spaced therefrom, a deflection ring secured to said shroud at the downstream end thereof and having a longitudinally arcuate deflecting surface curving progressively inwardly toward the longitudinal center line of the nozzle in a direction downstream from the discharge end thereof, said deflection ring having a no-control position and a fully deflected position, the diameter of said deflection ring being such that only the discharge end thereof is adjacent the gas stream when the deflection ring is in a no control position and a portion of the deflection ring adjacent to the discharge end of said nozzle is at the edge of the gas stream and forms a smooth continuation of a portion of said nozzle when the deflection ring is in a full deflected position whereby the gas stream is smoothly deflected to the desired direction without turbulence or induced flow when the deflection ring is fully deflected.

3. The apparatus of claim 2 wherein said nozzle is a contoured nozzle.

4. In combination with a vehicle including a reaction motor and propelled by combustion gases, a thrust vectoring system comprising; a nozzle secured to the vehicle for utilizing the gases to propel the vehicle, a collar disposed about said nozzle and fixed to the vehicle, a seat secured to said collar, a pair of diametrically opposed pivot means disposed in said seat, a shroud disposed about said nozzle and pivotally mounted on said means in sliding contact with said seat for movement to a position between a non-control position and a full control position, means for moving said shroud to a selected position, annular thrust deflection means secured to said shroud downstream said nozzle and longitudinally spaced from the discharge end of said nozzle to prevent contact of said deflection means with said nozzle during movement of said shroud, said deflection means having an annular longitudinally arcuate deflecting surface of high temperature resistant material and curving progressively inwardly toward the longitudinal centerline of said nozzle in such a manner that the downstream end thereof is smaller than the end adjacent to said nozzle, said deflection means being radially displaced from the flow of combustion gases when said nozzle is in the non-control position, a portion of said longitudinally arcuate reflecting surface providing a smooth continuation of a portion of said nozzle when said shroud is in the full control position, said deflection means being supported by said shroud a substantial distance from said pivot means whereby pivotal movement of said shroud moves said deflection means substantially normal to the longitudinal axis of said nozzle whereby the combustion gases are gradually deflected in a desired direction without turbulence when the shroud is moved to the full control position.

References Cited in the file of this patent

UNITED STATES PATENTS

| | | |
|---|---|---|
| 2,654,552 | Jonas | Oct. 6, 1953 |
| 2,780,059 | Fiedler | Feb. 5, 1957 |
| 2,846,844 | O'Rourke | Aug. 12, 1958 |

FOREIGN PATENTS

| | | |
|---|---|---|
| 68,790 | France | Jan. 27, 1958 |
| 1,025,715 | France | Jan. 28, 1953 |
| 1,025,827 | France | Jan. 28, 1953 |
| 1,147,262 | France | June 3, 1957 |
| 722,338 | Great Britain | Jan. 26, 1955 |
| 727,255 | Great Britain | Mar. 30, 1955 |